US012632115B2

(12) United States Patent
    Eder et al.

(10) Patent No.:    US 12,632,115 B2
(45) Date of Patent:      May 19, 2026

(54) HAPTIC FEEDBACK SYSTEM AND METHODS

(71) Applicant: Sony Interactive Entertainment Inc., Tokyo (JP)

(72) Inventors: Michael Eder, London (GB); Jesus Lucas Barcias, London (GB); Philip Cockram, London (GB); Lucy Hattersley, London (GB); Mandana Jenabzadeh, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 56 days.

(21) Appl. No.: 18/585,146

(22) Filed: Feb. 23, 2024

(65) Prior Publication Data

US 2024/0295927 A1     Sep. 5, 2024

(30) Foreign Application Priority Data

Mar. 2, 2023    (GB) ..................................... 2303060

(51) Int. Cl.
     *G06F 3/01*          (2006.01)
(52) U.S. Cl.
     CPC .................................... *G06F 3/016* (2013.01)
(58) Field of Classification Search
     CPC ...................................................... G06F 3/016
     See application file for complete search history.

(56) References Cited

U.S. PATENT DOCUMENTS

| | | | |
|---|---|---|---|
| 10,564,722 B2 * | 2/2020 | Keller | ..................... G06F 3/014 |
| 2013/0106691 A1 | 5/2013 | Rank | |
| 2015/0033588 A1 | 2/2015 | Lai | |
| 2015/0070148 A1 | 3/2015 | Cruz-Hernandez et al. | |
| 2017/0127753 A1 * | 5/2017 | Kohatsu | ................. A43B 7/142 |
| 2017/0185152 A1 * | 6/2017 | Keller | ..................... G06F 3/016 |
| 2018/0027893 A1 * | 2/2018 | Bangera | ............. A41D 13/0506 |
| 2019/0223812 A1 * | 7/2019 | Boyd | ....................... G08B 6/00 |
| 2019/0384404 A1 | 12/2019 | Raghoebardajal | |
| 2021/0012628 A1 | 1/2021 | Doy et al. | |
| 2021/0052980 A1 | 2/2021 | Lindemann et al. | |
| 2024/0286030 A1 | 8/2024 | Barcias | |
| 2024/0293735 A1 | 9/2024 | Henderson et al. | |

FOREIGN PATENT DOCUMENTS

CN        114185423 A     3/2022

OTHER PUBLICATIONS

Office Action in United Kingdom Appln. No. GB 2303060.4, mailed on Apr. 17, 2025, 5 pages.
Combined Search and Examination Report for corresponding GB Application No. 2303060.4, 10 pages, Aug. 25, 2023.

* cited by examiner

*Primary Examiner* — Quan Zhen Wang
*Assistant Examiner* — Mancil Littlejohn, Jr.
(74) *Attorney, Agent, or Firm* — Fish & Richardson P.C.

(57)           ABSTRACT

A haptic feedback system includes: a wearable device comprising one or more enveloped regions filled with a non-Newtonian fluid; and one or more force providers configured to provide, to at least one of the enveloped regions, a force that modifies a viscosity of the non-Newtonian fluid to change a resistance to deformation of the wearable device in at least one direction.

16 Claims, 5 Drawing Sheets

520
520
522a    522b

510

310

420

422

410

422a          422b          422c

Providing 610

600

522a 522b

510

HAPTIC FEEDBACK SYSTEM AND METHODS

FIELD OF INVENTION

The present invention relates to haptic feedback systems and methods.

BACKGROUND

Haptic feedback can involve the provision of non-visual and non-auditory sensory stimulation to a user, such a user viewing a virtual world (for example via a head-mountable display, HMD). One of the most common forms of haptic feedback is using a vibration motor to provide a sensation to a user. For example, a video game controller may vibrate if a user's avatar takes damage. As another example, a smart phone may vibrate to indicate that a key of an on-screen keyboard has been pressed in order to provide feedback to a user. As a further example, airplanes may use haptic feedback as a safety feature by using a so-called "stick shaker", which vibrates in response to a detection of an aerodynamic stall. This alerts the pilots so that they can take appropriate corrective action.

Other means of providing haptic feedback have previously been devised, such as the triggers of the DualSense® controller. These dynamic triggers may modify the amount of force required to move the triggers in order to provide haptic sensations to a user.

However, previous techniques for providing haptic feedback to a user are limited in the types of sensations that they can convey to the user.

It is in this context that the present disclosure arises.

SUMMARY OF THE INVENTION

In a first aspect, a haptic feedback system is provided in claim 1.

In another aspect, a method of controlling a wearable device is provided in claim 13.

Further respective aspects and features of the invention are defined in the appended claims.

BRIEF DESCRIPTION OF THE DRAWINGS

Embodiments of the present invention will now be described by way of example with reference to the accompanying drawings, in which.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
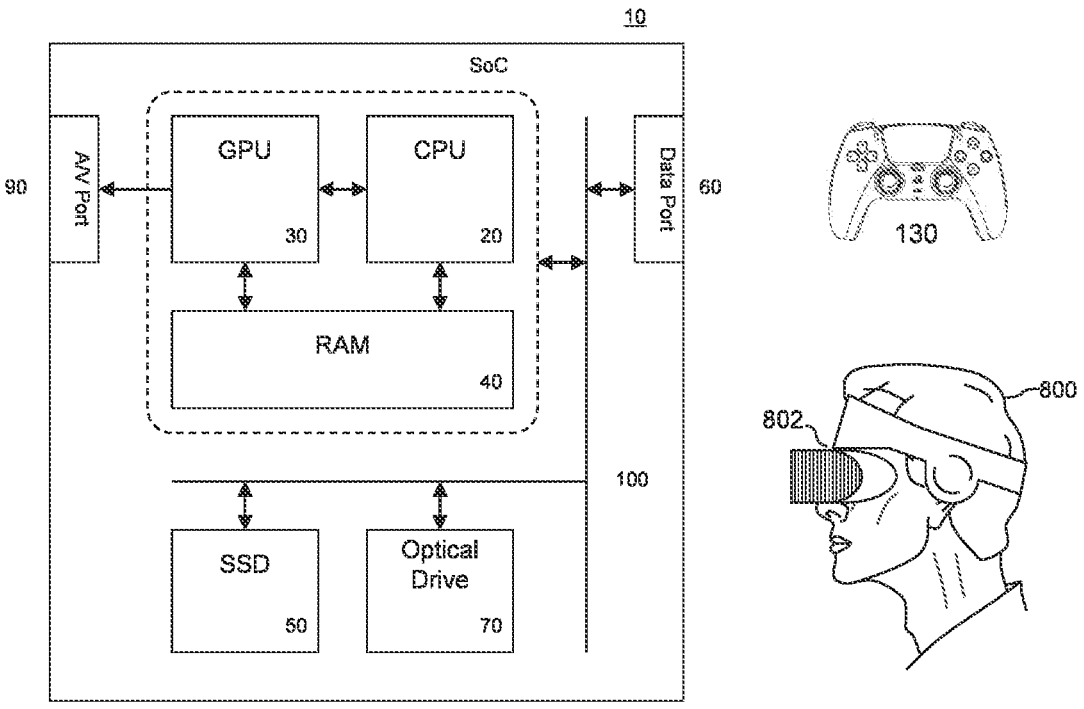
FIG. 1 schematically illustrates an example entertainment system.

Referring to FIG. 1, an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Interaction with the system is typically provided using one or more handheld controllers 130, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800. Alternatively, or in addition, a TV or monitor may be used.

The current techniques for providing haptic feedback to a user are limited in the forms of sensations that they can convey to the user. Therefore, there is a need to be able to provide additional types sensations to a user via haptic feedback.

Figure 2:
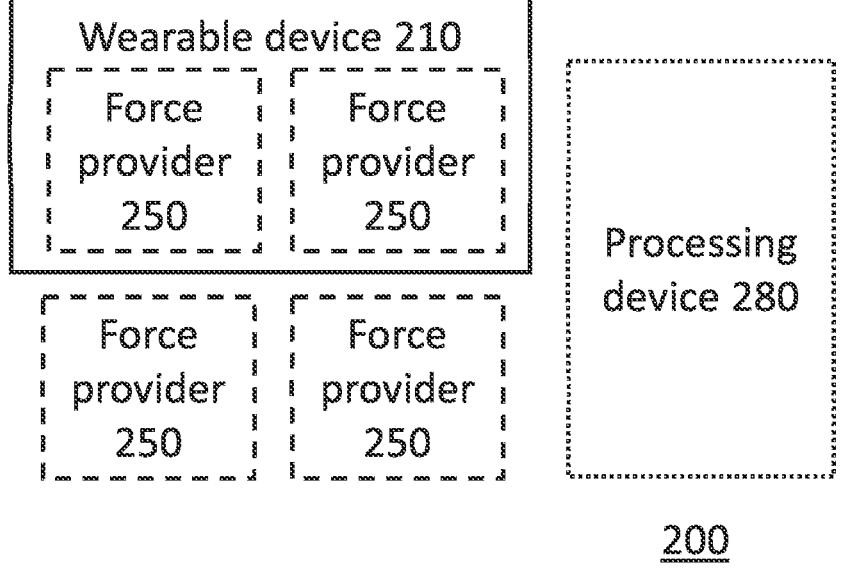
FIG. 2 schematically illustrates an example haptic feedback system.

Accordingly, turning now to FIG. 2, in an embodiment of the present description, a haptic feedback system 200 is provided. The haptic feedback system 200 comprises a wearable device 210; and one or more force providers 250. The wearable device 210 and the one or more force providers 250 will each be discussed in turn.

The wearable device 210 is a device that can be worn by a user. The wearable device described herein is not limited to being a particular style of wearable device for any given implementation. For example, the wearable device 210 may be implemented in the style of a glove that is intended to be worn on a hand of a user. However, the wearable device may also be implemented in the style of a sock that is intended to be worn on a foot of a user. The wearable device may also be implemented in the style of a sleeve that can be worn on an arm or leg of a user, a headband that can be worn on a user's head or incorporated into a device such as an HMD, a shirt or t-shirt that can be worn on a user's torso, a pair of trousers that can be worn on a user's leg, and/or any other suitable style that can be worn by a user.

The wearable device 210 comprises one or more enveloped regions filled with a non-Newtonian fluid. An enveloped region in this context refers to an enclosed volume in which the non-Newtonian fluid is provided, such as a sealed capsule or pouch, with the fluid filling the volume to any preferred level. For instance, the enveloped region may be completely filled (such that the volume of fluid matches or substantially matches that of the region), or may only be partially filled (such as fifty percent filled) to any suitable degree.

A non-Newtonian fluid is a fluid that does not follow Newton's law of viscosity. Instead, the viscosity of a non-Newtonian fluid is dependent on a force that is acting, or has recently acted, upon the non-Newtonian fluid. Therefore, a non-Newtonian fluid can become more solid-like or more liquid-like in dependence upon a force provided to the non-Newtonian fluid.

Some non-Newtonian fluids, such as silica particles mixed with polyethylene glycol, oobleck (a mix of corn starch and water) or custard may increase in viscosity in response to an increase in an applied force. A notable example of a non-Newtonian fluid increasing in viscosity in response to an increase in an applied force is running across a pool full of custard. The impact force provided to the custard by each step increases the viscosity of the custard to a degree that is sufficient to support a human's weight. This makes it possible to run across the surface of the custard without sinking. However, it should be noted that it is inadvisable to stand still on the surface of the custard, because the force provided to the custard by standing still will not be large enough to increase the viscosity of the custard to a degree that is sufficient to support a human's weight, which will result in sinking into the custard.

Other non-Newtonian fluids, such as paint or ketchup, may decrease in viscosity in response to an increase in an applied force. A magnetorheological fluid is another example of a non-Newtonian fluid. The viscosity of a magnetorheological fluid is dependent upon a magnetic force applied to the magnetorheological fluid.

Any of these types of non-Newtonian fluids may be used (either alone or in combination) in embodiments of the present disclosure.

In embodiments of the present disclosure, one or more force providers 250 are configured to provide, to at least one of the enveloped regions, a force that modifies a viscosity of the non-Newtonian fluid to change a resistance to deformation of the wearable device in at least one direction.

A force provider 250 may be configured to provide to at least one of the enveloped regions in a number of ways. For example, a force provider may be an electromechanical vibrator (e.g. an electric motor having a driveshaft attached to an unbalanced mass), a piezo-electric actuator, a speaker driver, an electromagnet, optionally, paired with one or more other electromagnets or permanent magnets, or any other suitable means for generating and/or providing a force to the non-Newtonian fluid.

In FIG. 2, a plurality of force providers 250 are shown, where each is surrounded by a dashed outline. The dashed outline indicates that each of these force providers are optional as long as the haptic system 200 comprises at least one force provider 250. Notably, at least one of the force providers 250 may be separate to the wearable device 210 and/or the wearable device 210 may comprise at least one of the force providers 250.

Therefore, in some embodiments, the one or more force providers 250 may all be separate to the wearable device 210. In other embodiments, the one or more force providers 250 may all be comprised by the wearable device 210. In yet further embodiments, the wearable device may comprise as least one force provider 250, and at least another force provider 250 may be separate to the wearable device 210.

For example, a force provider 250 that is separate to the wearable device 210 may be one of the handheld controllers 130. The handheld controllers 130 typically already comprise at least one electromechanical vibrator for providing haptic feedback to a user. In a case where the wearable device 210 is worn on, or near, a user's hand, an electromechanical vibrator of a controller 130 held by a user may be used to provide a force to the wearable device 210.

Therefore, an electromechanical vibrator of a handheld controller 130 may be used as a force provider 250 configured to provide, to at least one of the enveloped regions filled with a non-Newtonian fluid, a force that modifies the viscosity of the non-Newtonian fluid to change a resistance to deformation of the wearable device 210 in at least one direction.

Alternatively, or in addition, a force provider 250 that is separate to the wearable device 210 may be an additional device worn by the user. Such as a wristband comprising an electromechanical vibrator, where the force generated by the wristband may be provided to at least one of the enveloped regions via the force conducting through the user.

Alternatively, or in addition, a force provider 250 that is both separate to, and comprised by, the wearable device 210 may be an electromagnet, and at least some of the enveloped regions may comprise a magnet. In this case, the electromagnet may be configured to generate an alternating magnetic field to provide a force to the magnet(s) comprised within the at least one of the enveloped regions, thus providing a force to the one or more enveloped regions.

Similarly, a force provider 250 that is separate to, and/or comprised by, the wearable device 210 may be an electromagnet, and the non-Newtonian fluid in at least some of the enveloped regions may be a magnetorheological fluid. In this case, a magnetic field generated by the electromagnet may be provided to the at least some of the enveloped regions to modify a viscosity of the magnetorheological fluid in the at least some of the enveloped regions.

Alternatively, or in addition, a force provider 250 that is comprised by the wearable device 210 may be an electromechanical vibrator, a piezo-electric actuator, and/or a speaker driver. Additionally, in some cases, at least one of the enveloped regions may optionally comprise one or more of the force providers 250.

Alternatively, or in addition, the one or more force providers, which may be separate to the wearable device 210 or comprised by the wearable device 210, may comprise one or more of the force providers 250 from the list consisting of: (i) a piezo-electric actuator; (ii) an electro-mechanical vibrator; (iii) a speaker driver; and (iv) an electromagnet.

In some embodiments of the present disclosure, the haptic feedback system 200 may optionally (as indicated by the dotted outline) comprise a processing device 280 that may be configured to provide a control signal for controlling the wearable device 210 to the one or more force providers 250. In these embodiments, the one or more force providers 250 may be configured to modify the force provided to the at least one of the enveloped regions in response to receiving the control signal from the processing device 280.

As an example, the control signal may be generated by the processing device 280 in response to an interaction between a user's avatar in a virtual environment and a virtual object in the virtual environment. In this case, the processing device 280 may provide a control signal to the one or more force providers 250 to modify a force provided to the at least one of the enveloped regions to change the resistance to deformation of the wearable device 210 in at least one direction so that the resistance to deformation of the wearable device 210 reflects a resistance to deformation of the virtual object. Therefore, the user may experience a representation of their avatar's physical sense of touch, which may increase the user's immersion.

As an illustrative example, in a case where a user's avatar is interacting with a firm virtual object (e.g. an apple), the processing device 280 may provide a control signal to the one or more force providers 250 to modify a force provided to the at least one of the enveloped regions to change the resistance to deformation of the wearable device 210 in at least one direction so that the resistance to deformation of the wearable device 210 is increased to reflect a resistance to deformation of the firm virtual object. This can therefore contribute to the user's sense of immersion, in that the expected sensation of handling the object is simulated by the increased resistance to deformation.

As another example, a user's avatar may be interacting with a virtual object that has a resistance to deformation that is dependent upon the amount by which the virtual object has already been deformed, such as a tennis ball, which becomes firmer the harder it is squeezed (i.e. the more that is deformed).

In this case, the processing device 280 may provide a control signal to the one or more force providers 250 to modify a force provided to the at least one of the enveloped regions to change the resistance to deformation of the wearable device 210 in at least one direction so that the resistance to deformation of the wearable device 210 is dependent upon the amount by which the virtual object has already been deformed to reflect a resistance to deformation of the virtual object. Therefore, the user may experience a representation of their avatar's physical sense of touch, which may increase the user's immersion.

As a further example, a user's avatar may be interacting with a soft virtual object (e.g. marshmallow or pillow). In this case, the processing device 280 may provide a control signal to the one or more force providers 250 to modify a force provided to the at least one of the enveloped regions to change the resistance to deformation of the wearable device 210 in at least one direction so that the resistance to deformation of the wearable device 210 becomes reduced to reflect a resistance to deformation of the soft virtual object.

Alternatively, or in addition, the control signal may be generated by the processing device 280 in response to a status effect applied to a user's avatar in a virtual environment. In this case, the processing device 280 may provide a control signal to the one or more force providers 250 to modify a force provided to the at least one of the enveloped regions to change the resistance to deformation of the wearable device 210 in at least one direction so that the effect perceived by the user due to the resistance to deformation of the wearable device 210 is representative of the status effect applied to the user's avatar.

As an illustrative example, a "slow down" status effect may be applied to a user's avatar. This status effect may slow the movement speed of the user's avatar. In response to the "slow down" status effect being applied to the user's avatar, the processing device 280 may provide a control signal to the one or more force providers 250 to modify a force provided to the at least one of the enveloped regions to increase the resistance to deformation of the wearable device 210 in at least one direction, which will slow the user's movements. Therefore, the effect perceived by the user due to the resistance to deformation of the wearable device 210 will be representative of the "slow down" status effect applied to the user's avatar.

As another example, a "haste" status effect may be applied to a user's avatar. This status effect may speed up the movement speed of the user's avatar. In response to the "haste" status effect being applied to the user's avatar, the processing device 280 may provide a control signal to the one or more force providers 250 to modify a force provided to the at least one of the enveloped regions to decrease the resistance to deformation of the wearable device 210 in at least one direction, which will allow the user to move faster. Therefore, the effect perceived by the user due to the resistance to deformation of the wearable device 210 will be representative of the "haste" status effect applied to the user's avatar.

In this case, the wearable device 210 may be configured to have a baseline resistance to deformation in at least one direction as a default state (i.e. when there is no status effect applied to the user's avatar). Therefore, enabling the "haste" effect may be better perceived by the user. It should be noted that such a default noticeable resistance to deformation may, for example, be provided by a default force being provided by the one or more force providers 250, and/or by using a non-Newtonian fluid that may decrease in viscosity in response to an increase in an applied force.

As a further example, a user's avatar may be injured in a manner that may restrict the use of one or more portions of the avatar's body. In response to the user's avatar being injured, the processing device 280 may provide a control signal to the one or more force providers 250 to modify a force provided to the enveloped regions located at a position on the user that corresponds to the injured portions of the user's avatar.

The provided force may increase the resistance to deformation of the wearable device 210 in at least one direction, which may restrict the use of the portions of the user's body that correspond to the injured portions of the user's avatar. Therefore, the effect perceived by the user due to the resistance to deformation of the wearable device 210 will be representative of the effect of the avatar's injuries on the avatar.

The skilled person will note that the haptic feedback system 200 is not limited to a case where a user is interacting with a virtual environment, and may be used in any other context in which it is desirable to provide haptic feedback to a user.

The below discussion of the wearable device 210 will be provided in a context where the wearable device 210 has been implemented in the style of a glove that is intended to be worn on a user's hand. However, the below described techniques may alternatively or additionally be implemented in a wearable device having another style as already discussed elsewhere herein.

Figure 3:
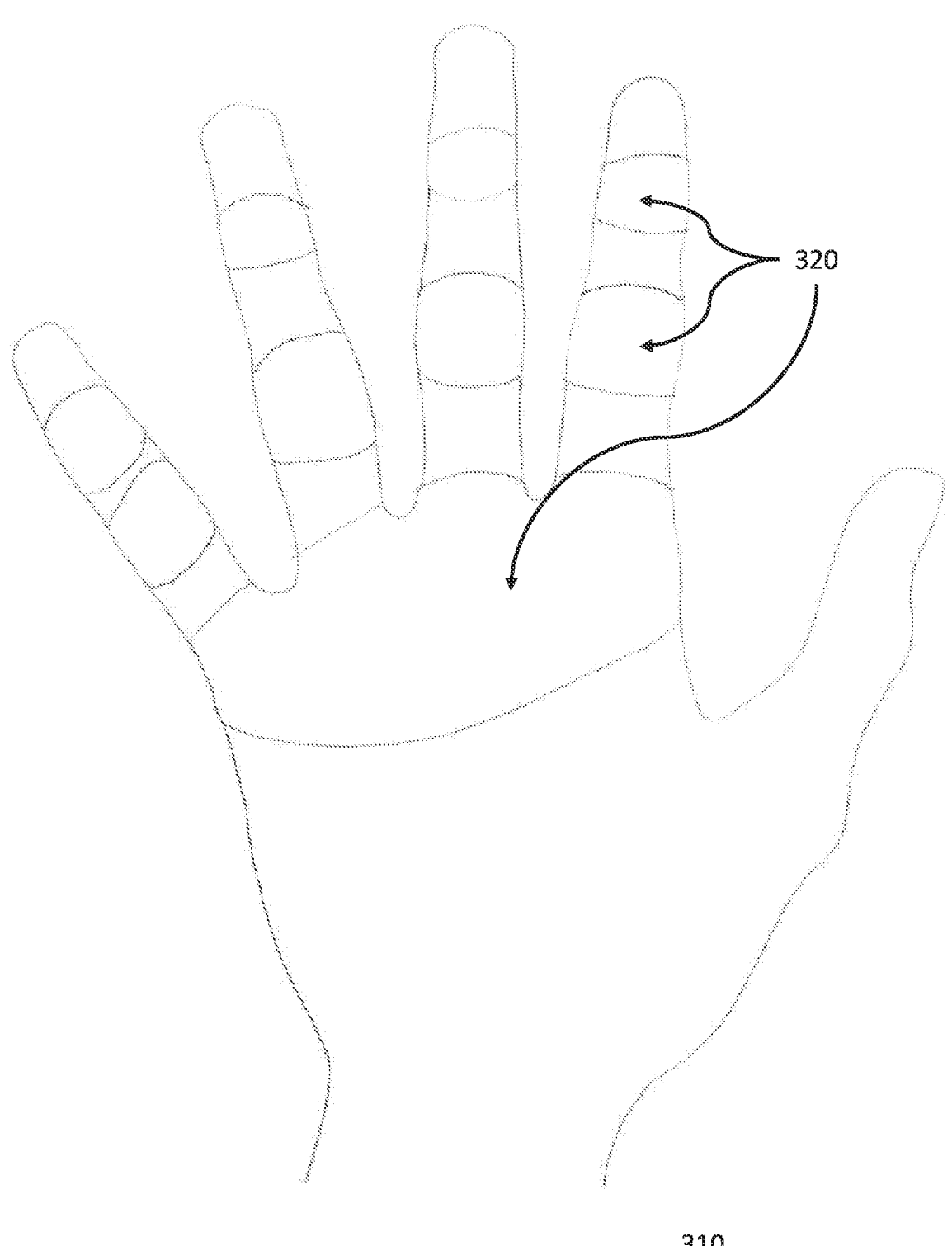
FIG. 3 illustrates an example wearable device.

FIG. 3 illustrates a wearable device 310 in the style of a glove that may be worn by a user. The wearable device 310 shown in FIG. 3 comprises one or more enveloped regions 320.

The one or more enveloped regions 320 are filled with a non-Newtonian fluid. The wearable device 310 may comprise one or more force providers (not shown), and/or one or more force providers may be separate to the wearable device 310, as discussed elsewhere herein.

In some embodiments of the present disclosure, the at least one of the enveloped regions 320 may be positioned at a location of the wearable device 310 corresponding to an expected location of a joint of a user when the wearable device 310 is worn by the user.

FIG. 3 illustrates an example of this positioning of the enveloped regions 320, where an enveloped region 320 is positioned at each of the expected locations of a user's finger joint, and an enveloped region 320 is positioned at the expected location of the user's knuckles, when the wearable device 310 is worn by the user.

As noted above, the wearable device is not limited to the style depicted in FIG. 3. For example, the wearable device may be a sleeve intended to be worn on a user's arm, and an enveloped region may be positioned at a location on the wearable device corresponding to an expected location of a user's elbow when the wearable device is worn by the user.

The one or more force providers are configured to provide, to at least one of the enveloped regions 320, a force that modifies a viscosity of the non-Newtonian fluid to change a resistance to deformation of the wearable device 310 in at least one direction.

For example, if the at least one enveloped region comprises a non-Newtonian fluid that increases in viscosity in response to an applied force, the one or more force providers may increase a resistance to deformation of the wearable device 310 in at least one direction by providing a force to the at least one enveloped region 320.

As an example, if the at least one enveloped region 320 is one of the regions positioned at the expected location of a user's finger joint, one or more force providers may increase the resistance to deformation of the wearable device 310 in the direction of actuation of the finger joint by providing a force to this enveloped region 320. Therefore, if the wearable device 310 is being worn by a user, a user may be required to use an increased force to articulate this finger when a force is provided to this enveloped region 320 by the one or more force providers.

Alternatively, a non-Newtonian fluid that decreases in viscosity in response to an applied force may be used. In this case, a force provided by a force provider may decrease a resistance to deformation of the wearable device 310 in at least one direction in the same manner as described above.

It should be noted that the wearable device 210 is not limited to the above described configuration. For example, one or more enveloped regions may be positioned at a location of the wearable device 310 that does not correspond to an expected location of a joint of a user when the wearable device 310 is worn by the user, such as the expected location of a user's finger tips.

Similarly, the wearable device 210 is not limited to resisting a motion of a user. For example the wearable device 210 may alternatively, or in addition, be used to provide a tactile sensation to a user. As an illustrative example, in a case where the wearable device 210 comprises one or more enveloped regions at the expected location of a user's finger tips, a change to the resistance of deformation of the wearable device 210 in at least one direction may provide a user with the sensation of touching an object, where a magnitude of the change in the resistance to deformation may be responsive to an intended hardness of the object that is to be simulated by the wearable device 210.

In some embodiments of the present disclosure, the at least one of the enveloped regions may comprise a plurality of sections separated from one another by at least one impermeable membrane.

Figure 4A:
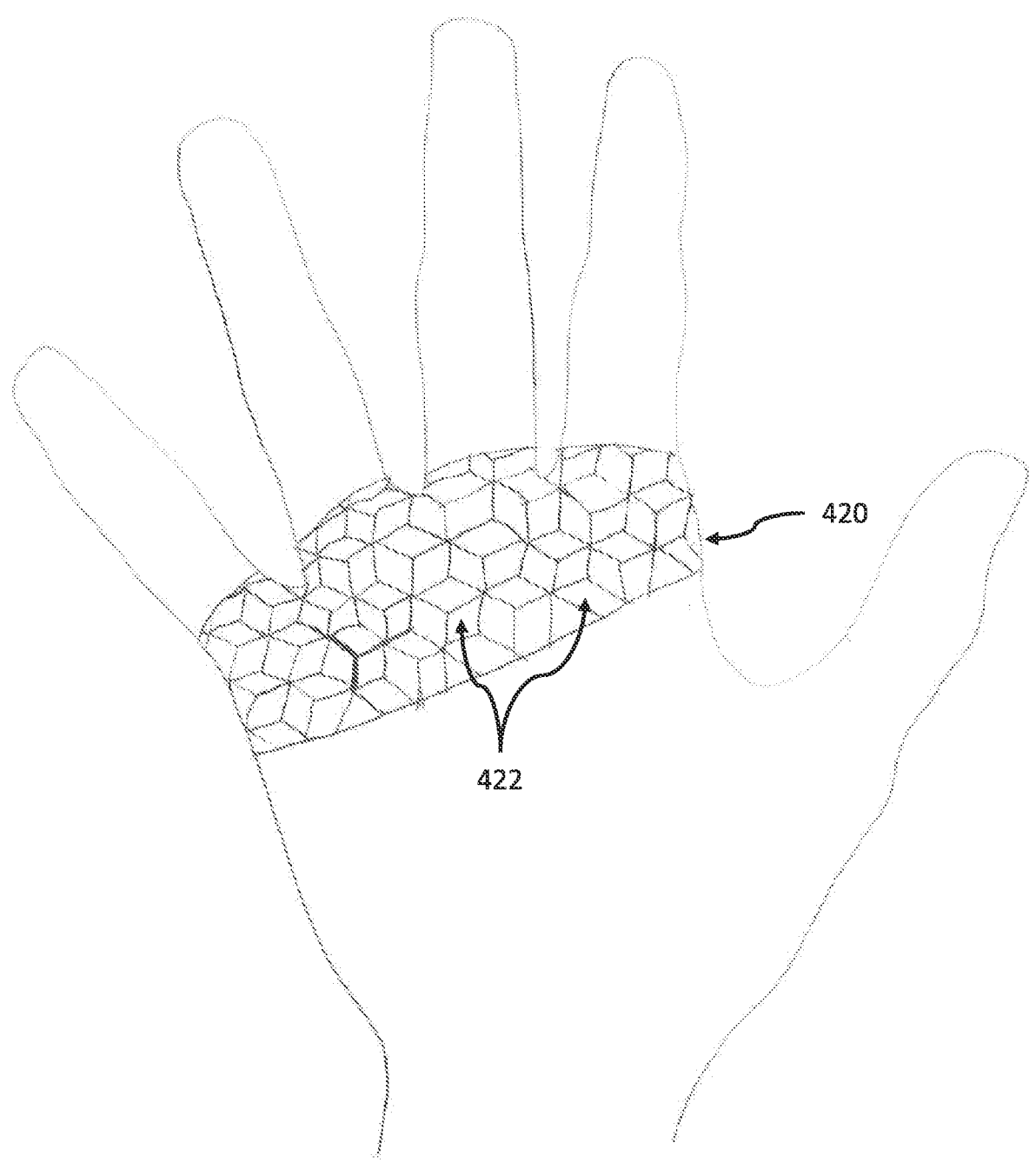
FIGS. 4A and 4B illustrate an example wearable device
Figures 4B, 6:
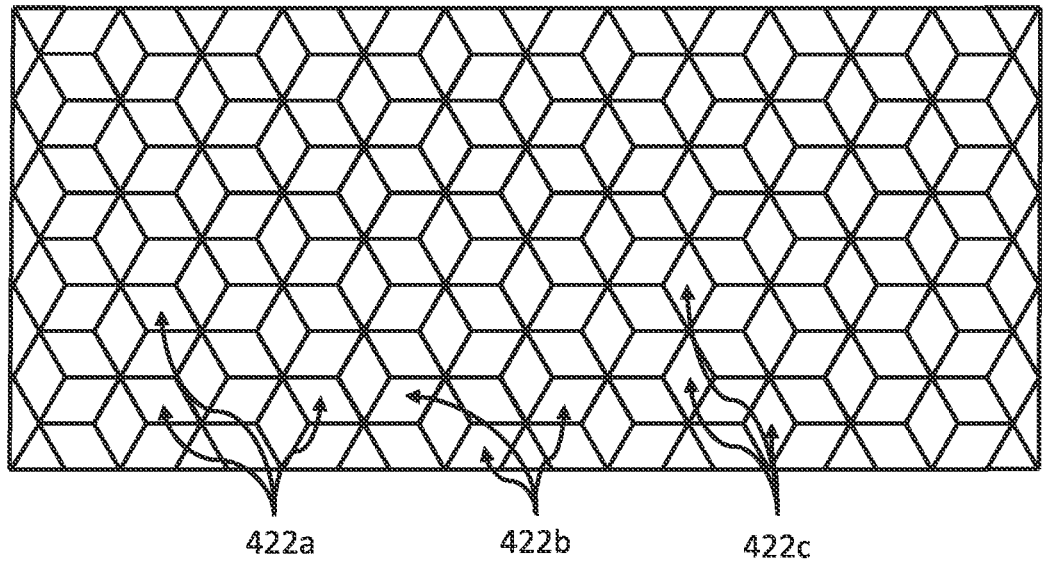
FIG. 6 schematically illustrates an example method.

For example, FIG. 4A illustrates an example wearable device 410 comprising an enveloped region 420 that comprises a plurality of sections 422 that are separated from one another by at least one impermeable membrane. The impermeable membrane may be formed any type of membrane that is impermeable to the non-Newtonian fluid. FIG. 4B illustrates a more detailed view of the enveloped region 420 and the plurality of sections 422.

Separating an enveloped region into a plurality of sections using at least one impermeable membrane may advantageously prevent the non-Newtonian fluid from pooling or accumulating in a portion of the enveloped region. In other words, separating an enveloped region into a plurality of sections using at least one impermeable membrane may advantageously enable the non-Newtonian fluid to be more evenly distributed throughout the enveloped region in comparison to an enveloped region that is not separated into a plurality of sections.

In some embodiments of the present disclosure, at least a respective one of the force providers may be configured to provide a force to a respective one of the plurality of sections 422.

For example, a first one of the sections 422 may comprise, or be coupled to, at least a first one of the force providers and a second one of the sections 422 may comprise, or be coupled to, at least a second one of the force providers. Therefore, the resistance to deformation of the first section 422 may be changed using at least the first one of the force providers and the resistance to deformation of the second section 422 may be changed using at least the second one of the force providers. Therefore, the resistance to deformation of the first section 422 may be changed independently of the resistance to deformation of the second section 422.

In some implementations the activation of the first of the force providers may influence the second section 422; however, due to the increased distance between these elements (relative to the first of the force providers and the first section) means that the effect would be reduced due to attenuation of a vibration or the like. In such a case the resistances to deformation of respective sections may not be entirely independent, but may instead be dependent in a predictable manner such that the effects of the other force providers can be accounted for and/or mitigated (for instance, through a noise-cancelling signal or the like).

As an example, a respective one of the plurality of sections may comprise, or be coupled to, a respective force provider. An example force provider that may be comprised by a respective section is an electro-mechanical vibrator, and an example force provider that may be coupled to a respective section is an electromagnet. These force providers are discussed in more detail elsewhere herein. Additionally, any other suitable force providers may also be used.

In the case of using an electromagnet as a force provider to provide a force to some, but not all of, the sections, at least some of the sections are configured to not use the electromagnet as a force provider, and are instead configured to use another type of force provider as discussed elsewhere herein. However, when using other types of force providers, all sections may use the same type of force provider when at least a respective one of the force providers is configured to provide a force to a respective one of the plurality of sections 422.

As an illustrative example, in a case where the resistance to deformation of the wearable device 410 may be configured to reflect a resistance to deformation of a virtual object in response to an interaction between a user's avatar and the virtual object, which is described elsewhere herein, one or more of the force providers may be configured to provide a force to the one or more of the sections 422 that are located at a position on the user that corresponds to a position on the user's avatar that is in contact with the virtual object to change a resistance to deformation of the wearable device 410 to reflect the resistance to deformation of the virtual object at the position on the user that corresponds to the position on the user's avatar that is in contact with the virtual object.

In some embodiments of the present disclosure, the plurality of sections may be arranged in a shape that is configured to provide a complementary resistance to deformation of the wearable device in at least another direction to that in which the provision of a force to a non-Newtonian fluid modifies a resistance to deformation. The plurality of sections being arranged in a shape that is configured to provide a complementary resistance to deformation of the wearable device in at least another direction may advantageously enable a more precise control over which directions the wearable device may resist, or not resist, deformation in. Here, complementary resistance is considered to be a resistance that is provided in at least the other direction due to the structure of the plurality of sections, where none of the plurality of sections may individually provide a resistance to deformation in at least the other direction.

Referring again to FIGS. 4A and 4B, the illustrated arrangement of the plurality of sections 422 are in a shape that is configured to provide a complementary resistance to deformation of the wearable device in at least another direction. This is one example of the plurality of sections 422 being arranged in a shape that is configured to provide a complementary resistance to deformation of the wearable device 420 in at least another direction.

In this arrangement, adjacent sections 422a, 422b, 422c are arranged in a tessellated pattern where there is no linear impermeable membrane extending continuously (i.e. unbroken) across the entire enveloped region. If a linear impermeable membrane extends continuously across the entire enveloped region, the wearable device 420 may not be able to resist deformation in a direction orthogonal to that membrane at the location of that membrane (the at least another direction) because there will be a notional plane through the wearable device that does not comprise a non-Newtonian fluid (i.e. the membrane plane defined by the linear impermeable membrane that extends continuously across the entire enveloped region).

Figure 5:
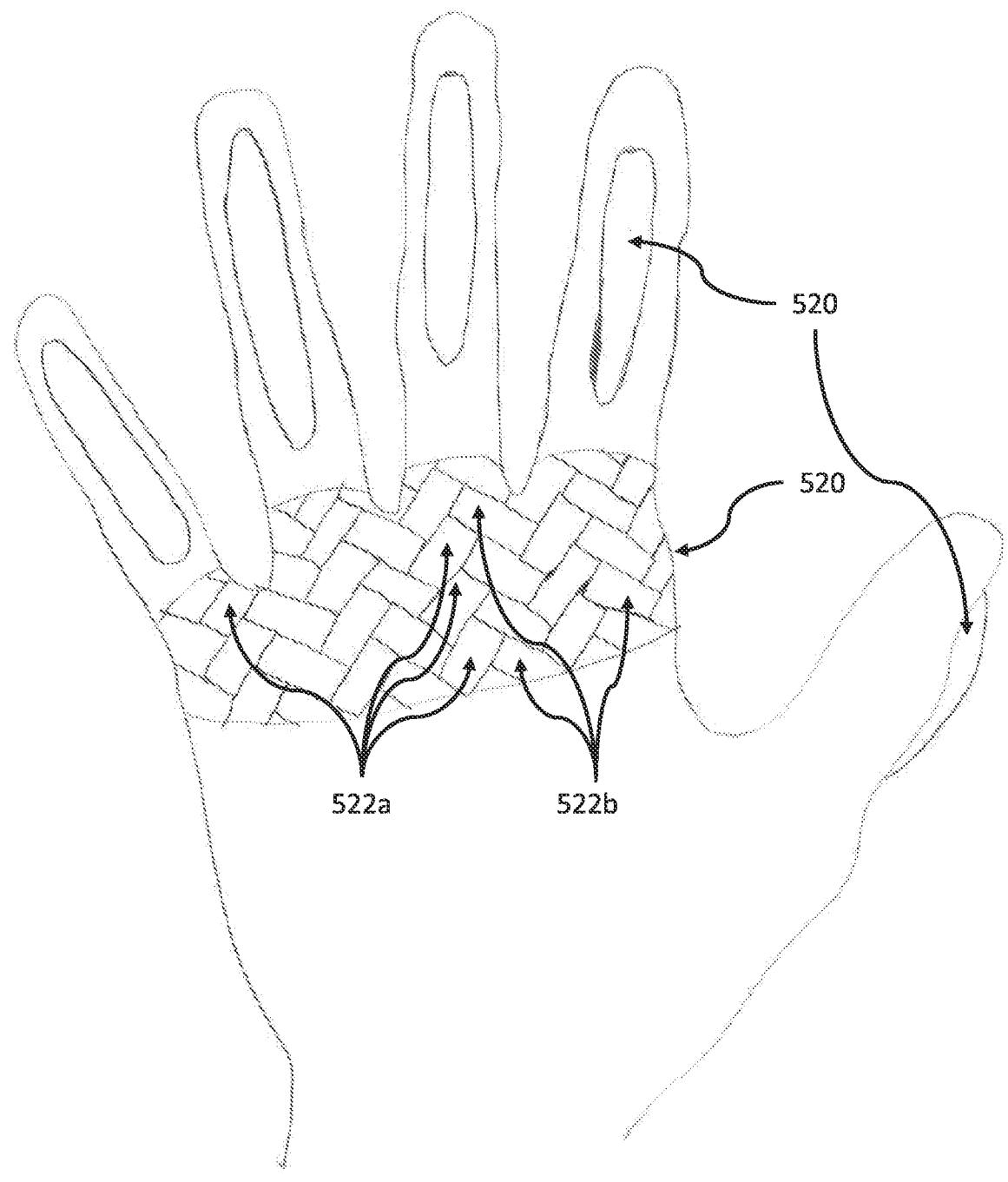
FIG. 5 illustrates an example wearable device.

FIG. 5 also illustrates an example of a wearable device 510 comprising one or more enveloped regions 520, where at least one of the enveloped regions 520 comprises a plurality of sections 522. In this illustrated example, the sections 522 are arranged in a herringbone pattern, which is another example of a configuration where the plurality of sections may be arranged in a shape that is configured to provide a complementary resistance to deformation of the wearable device in at least another direction.

Optionally, in some embodiments of the present disclosure, a respective direction of the resistance to deformation, and/or of the complementary resistance to deformation, may be responsive to a respective force provided by at least a respective one of the force providers.

For example, referring to FIG. 5, a first set of one or more force providers may be configured to provide a force to one or more of the enveloped regions 520 located along the back of the expected position of a user's fingers when the user is wearing the wearable device 510, and a second set of one or more force providers may be configured to provide a force to the enveloped region 520 located at the behind the expected position of the user's knuckles when the user is wearing the wearable device 510.

In this example, the first set of one or more force providers may provide a force that changes the resistance to deformation of the wearable device 510 in a direction of articulation of a user's fingers, and the second set of one or more force providers may provide a force that changes the resistance to deformation of the wearable device 510 in a direction of articulation of a user's knuckles.

As another example, referring now to FIG. 4B, be a first set of one or more force providers may be configured to provide a force to one or more of the sections 422a, a second set of one or more force providers may be configured to provide a force to one or more of the sections 422b, and a third set of one or more force providers may be configured to provide a force to one or more of the sections 422c.

In this example, a difference between the forces provided by at least one of the first, second and third set of one or more force providers may change the complementary resistance to deformation in at least one direction. For example, the sections 422a, 422b may have a large resistance to deformation in comparison to the resistance to deformation of the sections 422c in response to the first and second set of force providers providing a force to their respective sections 422a, 422b different to a force provided to the sections 422c by the third set of force providers.

In this case, the complementary resistance to deformation in up-down and left-right directions (relative to the orientation of FIG. 4B) will be lower in comparison to a case where all of the sections 522 have a large resistance to deformation. This is because there are two directions where notional planes (or notional linear lines in the two dimensional example of FIG. 4B) can continuously extend through the enveloped region where there is only a low resistance to deformation. For example, a notional linear line that extends through the enveloped region and passes through either of the two sets of opposing vertices of any of the sections 422c will continuously extend through the enveloped region where there is only a low resistance to deformation (it should be noted that the membrane is considered to have a low resistance to deformation in this example).

It should be noted that the specific sections used in the above example are not limiting and a different one or more of the sections 422 may have a lower resistance to deformation in comparison to the other one or more of the sections 422. Additionally, the sections 422a, 422c may have a lower resistance to deformation in comparison to the sections 422b. Any other suitable combination of sections may also be used.

As a further example, referring again to FIG. 5B, a first set of one or more force providers may be configured to provide a force to one or more of the sections 522a, and a second set of one or more force providers may be configured to provide a force to one or more of the sections 522b. In this example, a respective direction of the complementary resistance to deformation may be responsive to a difference in a respective force provided by at least a respective one of the force providers.

In the two previous examples, a respective direction of the complementary resistance to deformation is responsive to a difference in a respective force provided by at least a respective one of the force providers. However, the embodiments where a respective direction of the complementary resistance to deformation may be responsive to a respective force provided by at least a respective one of the force providers is not limited to such an implementation.

For example, in some embodiments, at least one of the sections may comprise a first non-Newtonian fluid; and at least another one of the sections may comprise a second non-Newtonian fluid having properties different to the first non-Newtonian fluid. In this case, even if all of the force providers provide the same force to their respective sections, the at least one of the sections comprising a first non-Newtonian fluid and the at least the other one of the sections comprising the second non-Newtonian fluid may have different resistances to deformation to one another.

It should also be noted that a case where at least one of the sections may comprise a first non-Newtonian fluid, and at least another one of the sections may comprise a second non-Newtonian fluid having properties different to the first non-Newtonian fluid, is not limited to embodiments where a respective direction of the resistance to deformation, and/or of the complementary resistance to deformation, may be responsive to a respective force provided by at least a respective one of the force providers. For example, multiple types of non-Newtonian fluids may be used in a case where the only force provider is a handheld controller 130 as described elsewhere herein.

Alternatively, or in addition, in some embodiments of the present disclosure, at least one of the regions may comprise a first non-Newtonian fluid; and at least another one of the regions may comprise a second non-Newtonian fluid having properties different to the first non-Newtonian fluid.

For example, the first non-Newtonian fluid may be a non-Newtonian fluid that increases in viscosity in response to an applied force and the second non-Newtonian fluid may be a non-Newtonian fluid that decreases in viscosity in response to an applied force.

As another example, the first non-Newtonian fluid may be a non-Newtonian fluid that increases in viscosity in response to an applied force and the second non-Newtonian fluid may be a non-Newtonian fluid that also increases in viscosity in response to an applied force, but by a lesser amount in comparison to the first non-Newtonian fluid.

As a further example, the first non-Newtonian fluid may be a non-Newtonian fluid that increases in viscosity in response to an applied force and the second non-Newtonian fluid may be a magnetorheological fluid.

It will be apparent to the skilled person that the first and second non-Newtonian fluids may any other suitable selection of non-Newtonian fluids.

In some embodiments of the present disclosure, the wearable device 210 may comprise a cushioning layer between the at least one of the enveloped regions and an expected position of a user when the wearable device is worn by the user.

The cushioning layer may be made of a material that may dampen the forces provided to the enveloped regions before the provided forces are felt by a user wearing the wearable device 210. For example, the cushioning layer may be made of a foam like material.

In some cases, the cushioning layer may be made of a material that is impermeable to a non-Newtonian fluid. In this case, the cushioning layer may form at least part of a layer that envelopes the at least one region filled with a non-Newtonian fluid. Alternatively, there may be an additional layer that envelopes the at least one region filled with a non-Newtonian fluid. In this case, the additional layer is positioned between the cushioning layer and the non-Newtonian fluid.

Referring now to FIG. 6, in some embodiments of the present disclosure, a method 600 for controlling a wearable device 210 according to embodiments of the present disclosure. The method 600 comprises the steps of providing, to at least one of the enveloped regions of the wearable device 210, a force that modifies a viscosity of the non-Newtonian fluid to change a resistance to deformation of the wearable device.

In some embodiments of the present disclosure, a computer program is provided. The computer program comprising computer executable instructions adapted to cause a computer system to control at least one force provider to perform any of the methods for controlling the wearable device 210 described elsewhere herein.

It will be appreciated that the above methods may be carried out on conventional hardware (such as the processing device 280, entertainment device 10, or HMD 802) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A haptic feedback system comprising: a wearable device comprising one or more enveloped regions filled with a non-Newtonian fluid; and one or more force providers configured to provide, to at least one of the enveloped regions, a force that modifies a viscosity of the non-Newtonian fluid to change a resistance to deformation of the wearable device in at least one direction.

2. The haptic feedback system according to clause 1, wherein the at least one of the enveloped regions comprises a plurality of sections separated from one another by at least one impermeable membrane.

3. The haptic feedback system according to clause 2, wherein at least a respective one of the force providers is configured to provide a force to a respective one of the plurality of sections.

4. The haptic feedback system according to any one of clauses 2-3, wherein the plurality of sections are arranged in a shape that is configured to provide a complementary resistance to deformation of the wearable device in at least another direction.

5. The haptic feedback system according to any one of the preceding clauses, wherein a respective direction of the resistance to deformation, and/or of the complementary resistance to deformation, is responsive to a respective force provided by at least a respective one of the force providers.

6. The haptic feedback system according to any one of clauses 2-5, wherein at least one of the sections comprises a first non-Newtonian fluid; and at least another one of the sections comprises a second non-Newtonian fluid having properties different to the first non-Newtonian fluid.

7. The haptic feedback system according to any one of the preceding clauses, wherein the wearable device comprises at least one of the force providers.

8. The haptic feedback system according to any one of the preceding clauses, wherein at least one of the force providers is separate to the wearable device.

9. The haptic feedback system according to any one of the preceding clauses, wherein the one or more force providers comprise one or more of the force providers from the list consisting of: (i) a piezo-electric actuator; (ii) a electro-mechanical vibrator; (iii) a speaker driver; and (iv) an electromagnet.

10. The haptic feedback system according to any one of the preceding clauses, wherein the at least one of the enveloped regions is positioned at a location of the wearable device corresponding to an expected location of a joint of a user when the wearable device is worn by the user.

11. The haptic feedback system according to any one of the preceding clauses, wherein the wearable device comprises a cushioning layer between the at least one of the enveloped regions and an expected position of a user when the wearable device is worn by the user.

12. The haptic feedback system according to any one of the preceding clauses, further comprising: a processing device configured to provide a control signal for controlling the wearable device to the one or more force providers, wherein the one or more force providers are configured to modify the force provided to the at least one of the enveloped regions in response to receiving the control signal from the processing device.

13. A method of controlling the wearable device of any one of the preceding clauses, the method comprising the steps of: providing, to at least one of the enveloped regions of the wearable device, a force that modifies a viscosity of the non-Newtonian fluid to change a resistance to deformation of the wearable device.

14. Computer software which, when executed by a computer, causes the computer to control at least one force provider to carry out the method of clause 13 for controlling the wearable device of any one of clauses 1-12.

15. A non-transitory machine-readable storage medium which stores computer software according to clause 14.

The invention claimed is:

1. A haptic feedback system comprising:
a wearable device comprising one or more enveloped regions filled with a non-Newtonian fluid;
one or more force providers configured to provide, to at least one of the enveloped regions, a force that modifies a viscosity of the non-Newtonian fluid to change a resistance to deformation of the wearable device in at least one direction; and
a processing device configured to receive a signal from an entertainment system and control the one or more force providers in response to the signal to provide haptic feedback to a user of the wearable device via the at least one of the enveloped regions,
wherein the at least one of the enveloped regions comprises a plurality of sections separated from one another by at least one impermeable membrane.

2. The haptic feedback system of claim 1, wherein at least a respective one of the force providers is configured to provide a force to a respective one of the plurality of sections.

3. The haptic feedback system of claim 1, wherein the plurality of sections are arranged in a shape that is configured to provide a complementary resistance to deformation of the wearable device in at least another direction.

4. The haptic feedback system of claim 2, wherein a respective direction of the resistance to deformation, and/or of the complementary resistance to deformation, is responsive to a respective force provided by at least a respective one of the force providers.

5. The haptic feedback system of claim 1, wherein
at least one of the sections comprises a first non-Newtonian fluid; and
at least another one of the sections comprises a second non-Newtonian fluid having properties different to the first non-Newtonian fluid.

6. The haptic feedback system of claim 1, wherein the wearable device comprises at least one of the force providers.

7. The haptic feedback system of claim 1, wherein at least one of the force providers is separate to the wearable device.

8. The haptic feedback system of claim 1, wherein the one or more force providers comprise one or more of
i) a piezo-electric actuator;
ii) a electro-mechanical vibrator;
iii) a speaker driver; and
iv) an electromagnet.

9. The haptic feedback system of claim 1, wherein the at least one of the enveloped regions is positioned at a location of the wearable device corresponding to an expected location of a joint of a user when the wearable device is worn by the user.

10. The haptic feedback system of claim 1, wherein the wearable device comprises a cushioning layer between the at least one of the enveloped regions and an expected position of a user when the wearable device is worn by the user.

11. The haptic feedback system of claim 1, wherein the at least one impermeable membrane does not extend continuously and linearly across an entirety of the at least one of the enveloped regions.

12. The haptic feedback system of claim 1, wherein the processing device is configured to process the received signal, wherein the received signal indicates a status effect or an interaction applied to an avatar in a virtual environment of the entertainment system.

13. The haptic feedback system of claim 1, wherein two or more adjacent sections of the plurality of sections are arranged in a tessellated pattern.

14. A non-transitory machine-readable storage medium storing:
instructions that when executed by a computer cause the computer to perform operations for controlling a wearable device, the operations comprising:
receiving a signal indicating a status effect or an interaction applied to an avatar in a virtual environment;
processing the received signal indicating the status effect or the interaction;
generating a control signal in response to the processed signal; and
providing the control signal to one or more force providers of the wearable device to modify a force applied to one or more enveloped regions filled with a non-Newtonian fluid of the wearable device, wherein the one or more force providers are configured to provide, to at least one of the one or more enveloped regions, a force that modifies a viscosity of the non-Newtonian fluid to change a resistance to deformation of the wearable device in at least one direction, wherein the at least one or more enveloped regions comprises a plurality of sections separated from one another by at least one impermeable membrane.

15. A method of controlling a wearable device of a haptic feedback system, the method comprising:

receiving, by a processing device of the haptic feedback system, a signal indicating a status effect or an interaction applied to an avatar of a user of the wearable device in a virtual environment;

processing, by the processing device, the received signal indicating the status effect or the interaction; and generating, by the processing device, a control signal to one or more force providers of the wearable device; and sending the control signal to the one or more force providers to modify a force applied to one or more enveloped regions of the wearable device, wherein the one or more enveloped regions are filled with a non-Newtonian fluid configured to change in viscosity in response to the force applied by the one or more force providers, wherein a change in the viscosity is configured to change a resistance to deformation of the wearable device in at least one direction, wherein at least one or more enveloped regions comprises a plurality of sections separated from one another by at least one impermeable membrane.

16. The method of claim 15, comprising:

changing the resistance to deformation of the wearable device to correspond to the status effect or the interaction applied to the avatar in the virtual environment.

\* \* \* \* \*